United States Patent [19]

Huang et al.

[11] Patent Number: 4,592,019

[45] Date of Patent: May 27, 1986

[54] BUS ORIENTED LIFO/FIFO MEMORY

[75] Inventors: Alan Huang, Ocean; Jay H. O'Neill, Old Bridge, both of N.J.

[73] Assignee: AT&T Bell Laboratories, Murray Hill, N.J.

[21] Appl. No.: 527,982

[22] Filed: Aug. 31, 1983

[51] Int. Cl.[4] .................. G11C 19/28; G11C 7/00
[52] U.S. Cl. ...................... 365/78; 365/189
[58] Field of Search ............ 365/78, 221, 73, 77, 365/219; 377/64, 67, 69, 77, 81

[56] References Cited

U.S. PATENT DOCUMENTS

| | | | |
|---|---|---|---|
| 4,151,609 | 4/1979 | Moss | 365/221 |
| 4,156,288 | 5/1979 | Spandorfer | 365/78 |
| 4,159,532 | 6/1979 | Getson et al. | 364/900 |
| 4,163,291 | 7/1979 | Suzuki et al. | 365/78 |
| 4,222,102 | 9/1980 | Jansen et al. | 365/221 |
| 4,323,790 | 4/1982 | Dunning et al. | 370/102 |
| 4,459,681 | 7/1984 | Ohtsuka | 365/78 |

OTHER PUBLICATIONS

Nordquist et al., "A Novel Rotate and Shift Circuit Using Bidirectional Gates", IEEE Transactions on Computers, vol. C-19, No. 9, Sep. 1970, pp. 802-808.

Primary Examiner—James W. Moffitt
Assistant Examiner—Glenn A. Gossage
Attorney, Agent, or Firm—John A. Caccuro

[57] ABSTRACT

There is disclosed a modular memory cell structure including a data latch, an occupancy bit latch and control logic. Each memory cell has access to the occupancy bit status of adjacent cells and to the input, output, control, and status busses. The occupancy status provides positional address information enabling each cell to determine if data in its data latch is the first, intermediate, or last element of a data queue. When a group of memory cells and an initialization circuit are interconnected, a modular integrated circuit design results which can function as either a first in-first out (FIFO) or a last in-first out (LIFO) memory.

10 Claims, 13 Drawing Figures

BUS ORIENTED LIFO/FIFO MEMORY

TECHNICAL FIELD

This invention relates to data memory cells and more particularly to a modular data memory cell for use as a part of either a FIFO (first in-first out) or LIFO (last in-last out) memory.

BACKGROUND OF THE INVENTION

Some prior art FIFOs are implemented using a shift register structure. One difficulty with this approach is that the data must traverse the entire length of the shift register before it can be read. This results in a fixed latency or fall-through time. Another difficulty is such a memory must be written into and read out from at the same time.

Other FIFOs are implemented using a random-access-memory (RAM) to store the information and a counter to point to the head of the queue and another counter to point to the tail. While this type of FIFO has a shorter fall-through time, the input and output can not be read and written at the same time since the memory is shared. This problem can be avoided by using a dual-ported memory, however, these memories are more complex requiring additional address decoding, bussing structure and logic circuitry.

Similarly, LIFO memories can be implemented with either a bi-directional shift register or a RAM memory to store the information and a up/down counter to point to the head of the list.

Thus, there is a continuing need in the art for less complex asynchronous FIFO and LIFO memory designs having faster read and write times.

SUMMARY OF THE INVENTION

According to the present invention a FIFO/LIFO memory is implemented using identical cells connected in a loop configuration, each cell comprising a storage section, a status section, and a control section. The storage section includes a latch to store data received from an input bus and to output data onto an output bus. The control section consists of an occupancy bit, positional addressing circuitry, and some control logic. The occupancy bit indicates whether or not the storage section of the cell is holding data. The positional addressing circuitry uses the cell's occupancy bit and the occupancy bit of adjacent cells to determine a cell's relative position within the data queue. The control logic uses the positional address and information indicating which end of the data queue is to be read or written from to determine if the cell should respond to a read or write command. The status section of the cell generates occupancy status information for a status bus of the FIFO/LIFO memory. Initialization circuitry is included to establish a fictitious full cell to prime the empty FIFO/LIFO memory.

BRIEF DESCRIPTION OF THE DRAWING

The detailed description of the invention will be more fully appreciated from the illustrative embodiment shown in the drawing, in which.

GENERAL DESCRIPTION

Figure 1:
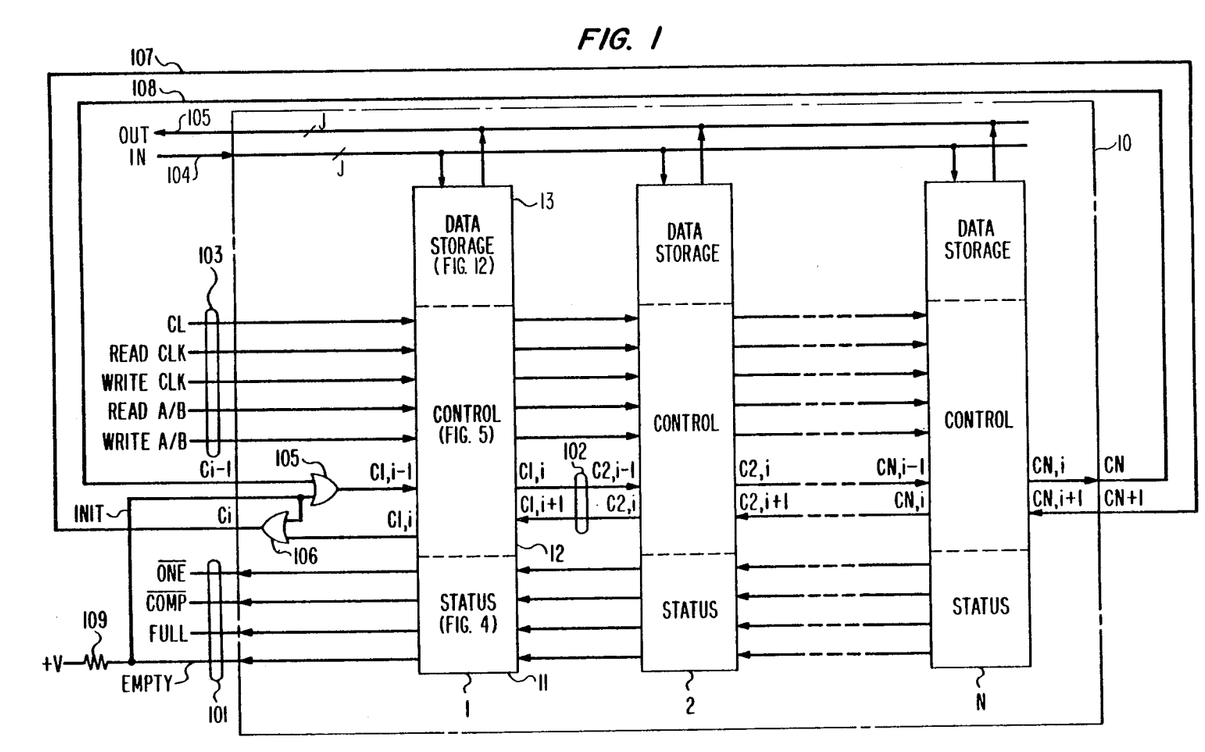
FIG. 1 is a block diagram of an N-cell FIFO/LIFO memory chip and external connection thereto in accordance with the present invention.

With reference to FIG. 1, the basic FIFO/LIFO integrated circuit chip 10 architecture consists of many identical cells (first cell 1, intermediate cell 2, implied intermediate cells 3 through N-1, and last cell N), each cell consisting of a status section (e.g., 11), a control section (e.g., 12), and a storage section (e.g., 13). The status sections are connected to status bus 101 and generates information ($\overline{ONE}$, $\overline{COMP}$, EMPTY, FULL) pertaining to the status of the data queue. The control section contains some control logic, positional addressing circuitry, and an occupancy bit memory and is connected to control bus 103 and the occupancy status signals (CN,i+1; CN,i-1) of the two neighboring cells. A typical occupancy status signal interconnection between adjacent cells shown by 102 where terminal C1,i outputs the occupancy bit status of cell 1 to cell 2 to terminal C2,i-1 and where the occupancy bit status of adjacent cell 2 is outputted via terminal C2,i to cell 1 via terminal C1,i+1. The occupancy status signal or bit of each cell indicates whether or not the associated storage section of that cell is holding data.

According to the present invention, this occupancy bit and the occupancy bits of the neighboring cells are used to determine the relative position of the cell in a data queue. The connections to command or control bus 103, informs each cell of a write request (WRITE CLK) and a read request (READ CLK) along with information pertaining to which end of the queue is to be processed during a write request (WRITE A/B) and which end of the queue is to be processed during a read request (READ A/B). The control logic uses the information from command bus 103 and its positional address circuitry to decide whether to store the input bus, to place the cell's data on the output bus, or neither. The storage section 13 consists of J data latches to store the data from input bus 104 and pass-gates to connect data from the J-latches to output bus 105.

POSITIONAL ADDRESSING AND STATUS INFORMATION

Figure 2:
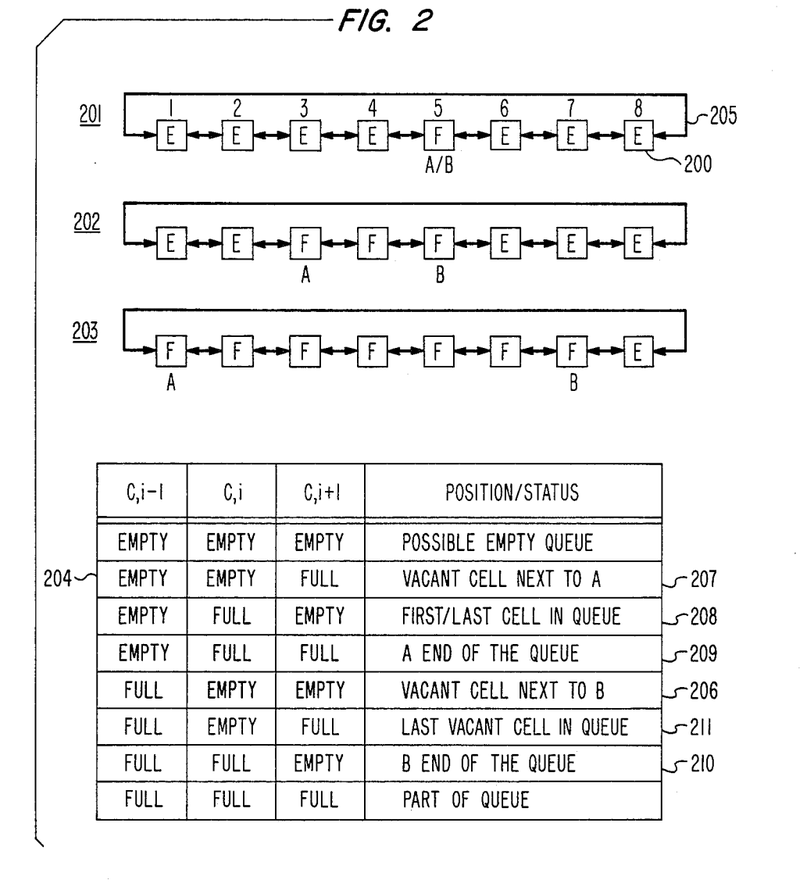
FIG. 2 shows a table and illustrative examples which show how adjacent cell status is used in determining positional addressing and queue status.

Reference to the table in FIG. 2 will assist in understanding how the present invention utilizes the occupancy status of itself and adjacent cells to provide positional addressing of the read and write signals to the appropriate cells of a FIFO/LIFO memory. Illustratively, in FIG. 2 are the occupancy bits of 8 cells (representing the occupancy status of the data queue) having different data queues contained therein in 201, 202 and 203. In 201, a one cell data queue is shown, in 202 a three cell data queue is shown, and in 203 a seven cell data queue is shown. In 201, 202 and 203 an empty cell is shown as E, a full cell is shown as F, one end of a data stream is shown as A, and the other end of the data stream is shown as B. A one cell data queue, 201, is shown as A/B. Table 204 illustrates the possible occupancy status signals from three successive cells $C,i$; $C,i-1$; and $C,i+1$ of the memory circuit or register of FIG. 1.

Generally, if the cell of interest is referred to as $C,i$ the preceding adjacent cell as $C,i-1$ and the subsequent adjacent cell as $C,i+1$. The index i increases from one end of the queue called A to the other end of the queue, B, then the cell A can be identified by the fact that cell $C,i-1$=empty, cell $C,i$=full, and cell $C,i+1$=full. Thus, in 202, cell A=cell 3 of 202. Cell B can be identified by the fact that cell $C,i-1$=full, $C,i$=full, and cell $C,i+1$=empty (e.g., cell B=cell 5 of 202). The vacant cell next to cell A can be identified by the fact that cell $C,i-1$=empty, cell $C,i$=empty, and cell $C,i+1$=full (e.g., cell 2 of 202). The vacant cell next to cell B can be identified by the fact that cell $C,i-1$=full, cell $C,i$=empty, and cell $C,i+1$=empty (e.g., cell 6 of 202).

The occupancy status of the cells can also be used to provide some information. For example, if $C,i-1$=full while $C,i$=empty and $C,i+1$=full (e.g., cell 8 of 203), then this indicates that cell 8 was the last empty cell and that the queue is completely full. If $C,i$=empty (e.g., cell 7 of 201) for all i then this indicates that the data queue was completely empty. If $C,i-1$=empty, $C,i$=full, and $C,i+1$=empty (e.g., cell 5 of 201) then this indicates that cell 5 was either the first or last cell of the queue. Finally, if $C,i-1$=full, $C,i$=full and $C,i+1$=full (e.g., cell 3 of 203), then this indicates that the cell is an interior element (e.g., it contains data) of the queue.

A FIRST-IN-FIRST-OUT QUEUE

According to the present invention, in order for the loop of cells, e.g., FIG. 2, to perform as a FIFO queue, the vacant cell next to either the A or B end of the data queue must function as the tail of the queue and store the new data item (one or more data bits) from the input bus and set its occupancy bit after the current data write cycle but before the next data write clock. Simultaneously, the other end of the queue must be able to function as the head of the queue and apply its data to the output bus and reset its occupancy bit after the current data read clock but before the next data read clock. For example in 202, a FIFO with a head at A and which grows towards B can be implemented by reading cell A (cell 3 of 202) and writing to the vacant cell next to B (cell 6 of 202). Likewise, a FIFO with a head at B and which grows towards A can be implemented by reading cell B and writing to the vacant cell next to A. It should be noted that changing the occupancy bit of the vacant cell next to the head only alters the location of the vacant cell next to the head of the queue and that changing the occupancy bit of the tail cell only alters the location of the tail of the queue. This absence of interaction between operations at the head and tail ends of the queue allows the reading and the writing operations to occur asynchronously. That is, the writing into and reading from the FIFO can occur at any time relative to each other. Circuitry insures that any change to the occupancy bit of the vacant cell next to head does not have any effect until after the write clock and that any change to the occupancy bit of the tail cell does not have any effect until after the read clock. This is necessary to prevent a domino-like effect in which neighboring cells instantaneously think that they have just become either the new vacant cell next to the head or the tail cell and act accordingly. Finally, in order to initialize or reset the queue, each cell must also be able to reset its occupancy bit on a clear signal.

A LAST-IN-FIRST-OUT QUEUE

According to the present invention, in order for the memory, e.g., 202 of FIG. 2 to perform as a LIFO queue, during the write operation the vacant cell next to either A or B must function as the head of the queue and store the new data item on the input bus and set its occupancy bit after the current write clock but before the next write clock. During a read operation the head cell must apply its stored data to the output bus and reset its occupancy bit after the current read clock but before the next read clock. A LIFO can be implemented with a head at either end A or B by either writing to the vacant cell next to A and reading from A or writing to the vacant cell next to B and reading from B. It should be noted that changing the occupancy bit of the vacant cell next to the head alters the location of the head and changing the occupany bit of the head cell will alter the location of the vacant cell next to the head. This makes it impossible to simultaneously read and write the LIFO queue. However, this is of no consequence since simultaneous or overlapped reading and writing of a LIFO queue is not part of the normal operation of a LIFO queue.

Circuitry insures that any change to the occupancy bit of the vacant cell next to the head does not have any effect until after the write clock and that any change to the occupancy bit of the head cell does not have any effect until after the read clock. Again, this is necessary to prevent a domino-like effect in which neighboring cells instantaneously think that they have just become either the new vacant cell next to the head or the new head cell and act accordingly. In order to initialize or reset the queue, each cell must also be able to reset its occupancy bit on a clear signal.

FIFO/LIFO QUEUE INITIALIZATION

With reference to FIG. 1, the clear and initialization circuitry is described. In order to initialize either a FIFO or a LIFO queue, it is necessary to reset the occupancy bit of all the cells on the clear signal (CL) and to temporarily apply a cell full signal to both the $C,i-1$ input of a right neighbor cell and the $C,i+1$ input of the left neighboring cell in order to create a fictitious full cell to prime the queue for the next write whenever all the cells are empty.

With reference to FIG. 2, it should be recalled that according to the present invention during FIFO or LIFO operation cells are written into and read out from either end A or B of the data queue. If there is no data in the queue (i.e., an empty memory) then there are no occupancy bit set in the queue and hence the present positional addressing circuitry would not known where to write the first data item into memory. With joint reference to FIGS. 1 and 2, this problem is solved using a fictitious full cell established by inserting gates 105 and 106 in the loop path 205 of memory 200.

In FIG. 1, the loop path (205) includes two connections 107 and 108. Path 108 connects terminal CN, the occupancy bit output of the cell N of chip 10, with terminal Ci−1, one input of a two input OR gate 105. Path 107 connects terminal CN+1, the input to cell N of the occupancy bit, to terminal Ci. Since there is no data in cells 1-N of chip 10, the wired OR output of cells 1-N, i.e., the EMPTY lead, which is connected through resistor 109 to positive potential V applies a logic 1 empty memory signal to the initialization terminal INIT. This logic 1 input to terminal INIT causes OR gate 105 to apply a logic 1 signal to input C1,i−1 of cell 1 and causes OR gate 106 to apply a logic 1 to output Ci of chip 10. This signal condition of initialization circuit (105, 106) simulates the existence of a fictitious full cell located between N and cell 1. With such a signal connection, the control circuitry of cell 1 of chip 10 would see C1,i−1=full, C,i=empty, and C,i+1=empty and according to 206 of FIG. 2 would consider cell 1 as the vacant cell next to end B of a data queue. Moreover, the control circuitry of cell N of chip 10 would see C,i−1=empty, C,i=empty and C,i+1=full and according to 207 of FIG. 2 would consider cell N as the next vacant cell next to end A of a data queue.

The fictitious full cell, gates 105 and 106, sees empty occupancy bits (C1,i=0, Ci−1=0) in its adjacent cells 1 and cell N and hence appears as the first/last cell in the data queue, 208 of FIG. 2. Thus, after initialization the first data written into the memory would either be written into cell 1 or cell N, depending from which end, A or B, the data queue is to grow.

Once data is written into any cell the EMPTY lead goes to logic 0. This makes the fictitious cell disappear since a logic 1 is no longer applied to CN,i+1 and C1,i−1. The cells will then default back to a loop configuration since terminal CN is logically connected to C1,i−1 via OR gate 105 as is output C1,i to terminal CN+1 via OR gate 106.

Figure 3:
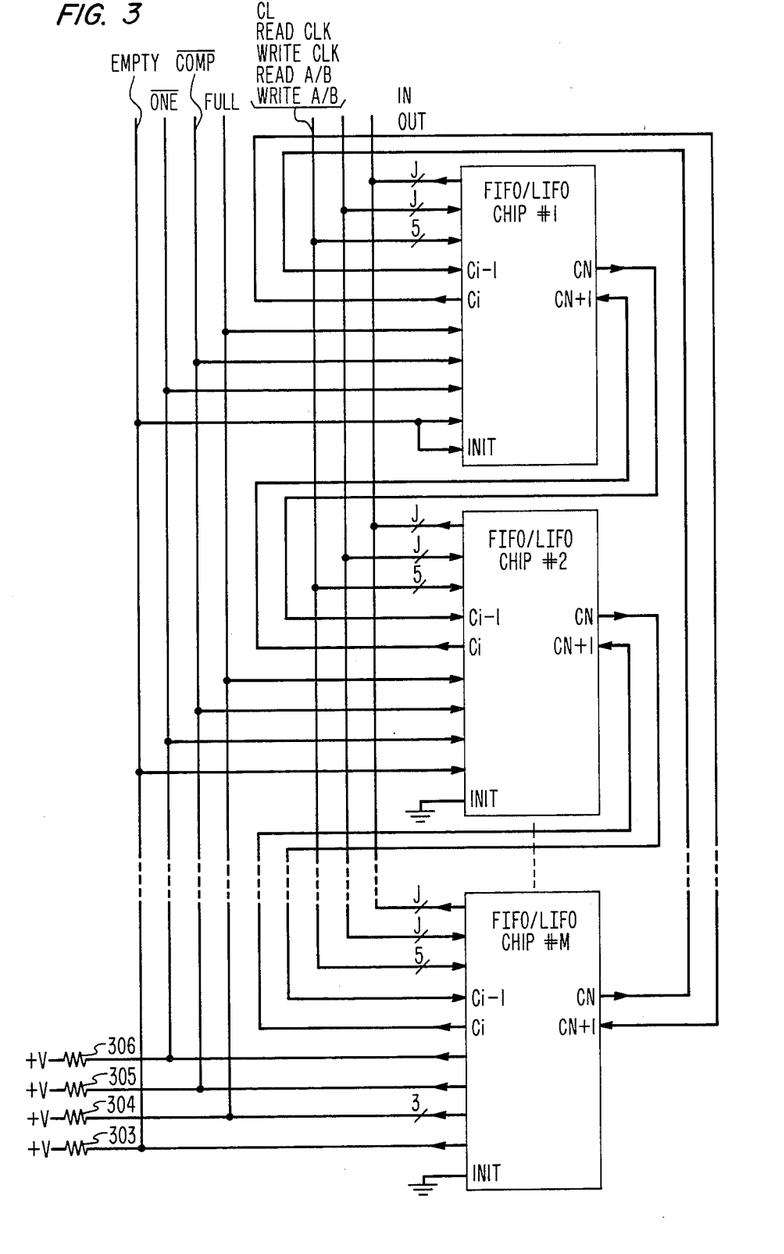
FIG. 3 shows the interconnection of M memory chips of the type shown in FIG. 1.

Shown in FIG. 3 is the connections required for a multiple chip arrangement including chips 1 through M. As shown, a multi-chip loop is formed by connecting terminal CN of chip M to terminal Ci-1 of chip 1, 301, and connecting terminal Ci of chip 1 to terminal C,N+1 of chip M, 302. The wired-OR connection of the EMPTY terminals of chips 1-M connect to resistor 303 and voltage +V and to terminal INIT of chip 1.

Since in the multiple chip connection shown in FIG. 3 the only fictitious bit needed appears between chip M and chip 1, the INIT terminals of chips 2-M are tied to a logic 0, ground potential. Note, the interconnection of occupancy bit status, CN to C,i−1 and C,N+1 to C,i between adjacent chips, are analogous to those previously described between adjacent cells of the chip 10 shown in FIG. 1. Again, if all cells of chips 1-M are empty then a fictitious full bit is established between chips M and 1. During such a condition, the first data entered will be written, depending on whether the data queue is to grow from A or B end, into either cell 1 of chip 1 or cell N or chip M. After the first data item is loaded into any cell of chips 1-M, as previously described, the lead EMPTY becomes logic 0 and the fictitious occupancy bit disappears. Note, the fictitious occupancy bit reappears, when the last data item is read from the cells of chips 1-M, thus priming the loop of cells for a subsequent write operation.

CELL IMPLEMENTATION

Figures 12, 13:
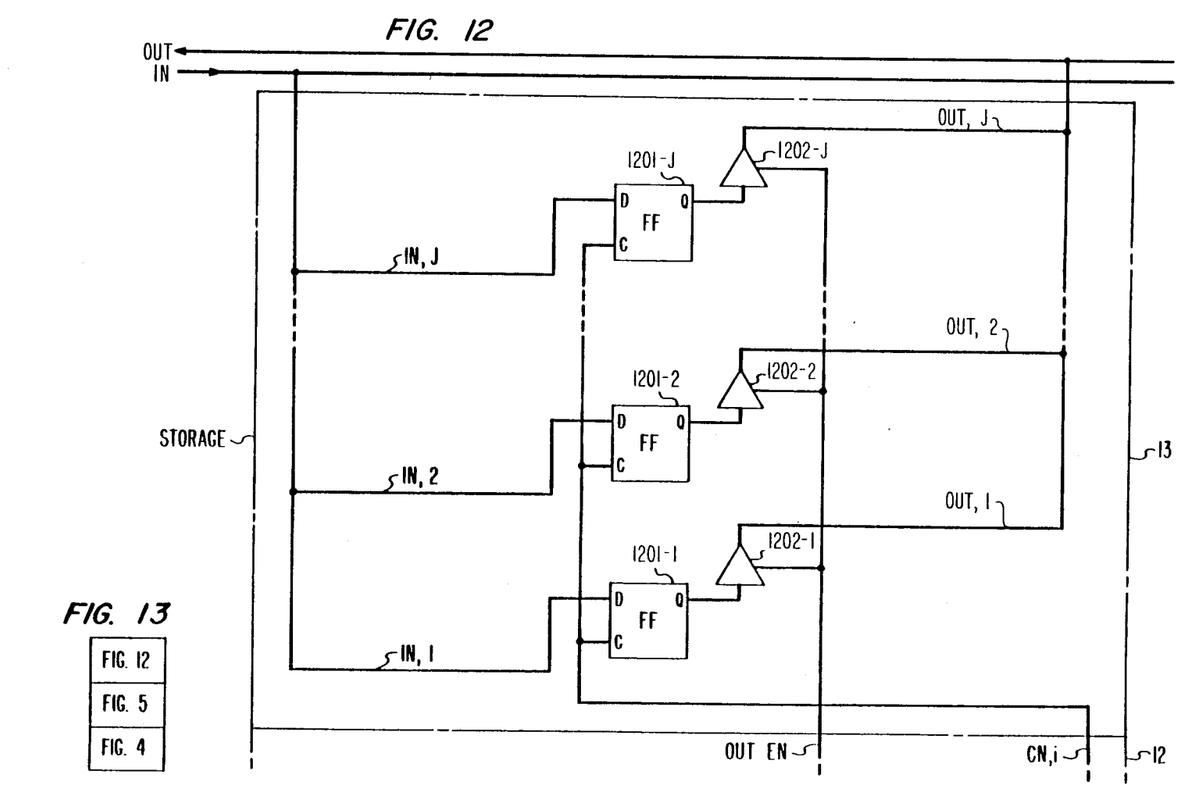
FIG. 12 shows the circuitry of the storage section of one FIFO/LIFO cell.
FIG. 13 shows the association of FIGS. 4, 5 and 12.

As shown in FIG. 1, the basic FIFO/LIFO cell, e.g., cell 11, consists of status section 11, a control section 12, and a memory section 13. These sections are designed such that they can be stacked in a column as shown in FIG. 1. FIG. 13 shows the association of the figures of the status section, FIG. 4, the control section, FIG. 5, and the storage section, FIG. 12.

Figure 4:
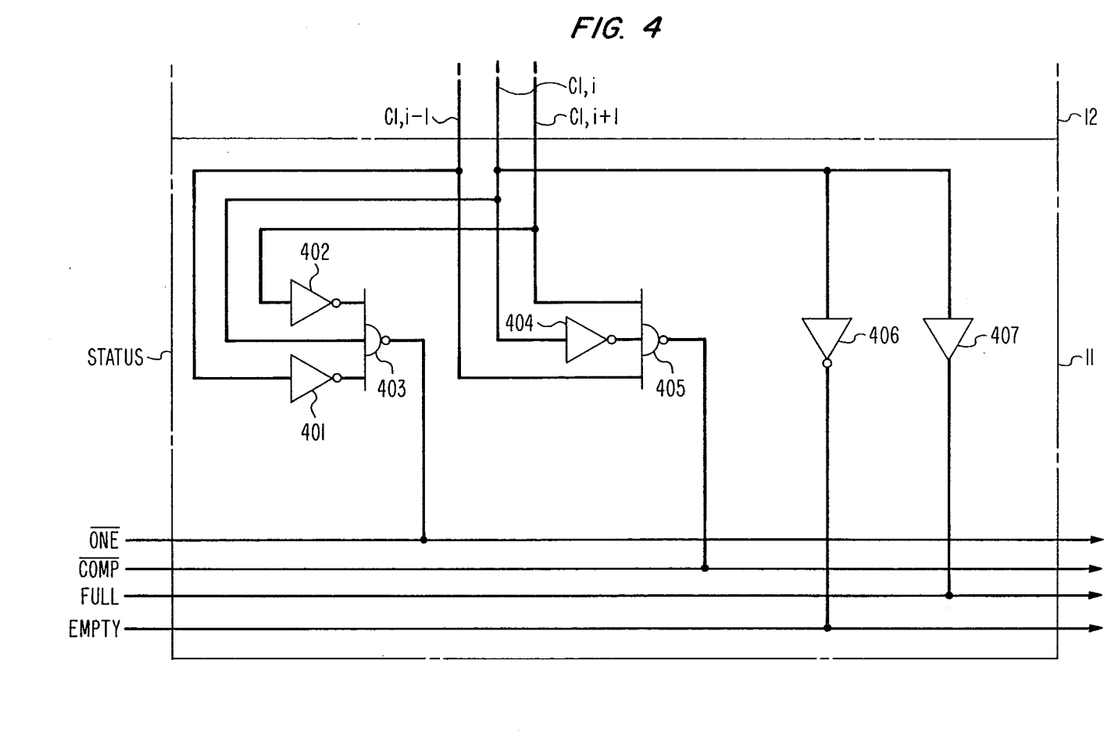
FIG. 4 shows the circuitry of the status section of one FIFO/LIFO cell.

The status section is shown in detail in FIG. 4 and comprises some logic and buffer gates. The signal on line $\overline{ONE}$, the inverted version of signal ONE, goes to ground indicating that cell C,i is full (logic 1) while adjacent cells C,i−1 and C,i+1 are empty (logic 0). Inverters 401, 402, three input open-collector Nand gate 403, together with resistor 306 (FIG. 3), generate the signal on line $\overline{ONE}$. The line $\overline{ONE}$ is a wired-OR connection to all memory cells 1-M of chip 10. The signal on line $\overline{COMP}$, the inverted version of a signal COMP, goes to ground indicating that cell C,i is empty while adjacent cells C,i−1 and C,i+1 are full. Inverter 404, three input open-collector Nand gate 405, together with resistor 305, generate the signal on line $\overline{COMP}$. The line $\overline{COMP}$ is also a wired-OR connection to all memory cells 1-M of chip 10.

The EMPTY binary signal for each cell is generated by having each cell, C,i, check its occupancy bit status C1,i. If the occupancy cell is full or occupied (C1,i=1) open collector inverter 406 grounds the EMPTY status line. This output in conjunction with an external pull-up resistor 303 generates a logic 1 EMPTY signal only when each cell of the memory circuit is empty.

The FULL signal for each cell is generated by having each cell, C,i, check its occupancy status C1,i. If the cell is empty or unoccupied (C1,i=0) then an open-collector inverter 407 grounds the FULL status line. This output in conjunction with external pull-up resistor 304 generates a logic 1 FULL signal only when each cell of the memory circuit is full.

Figure 5:
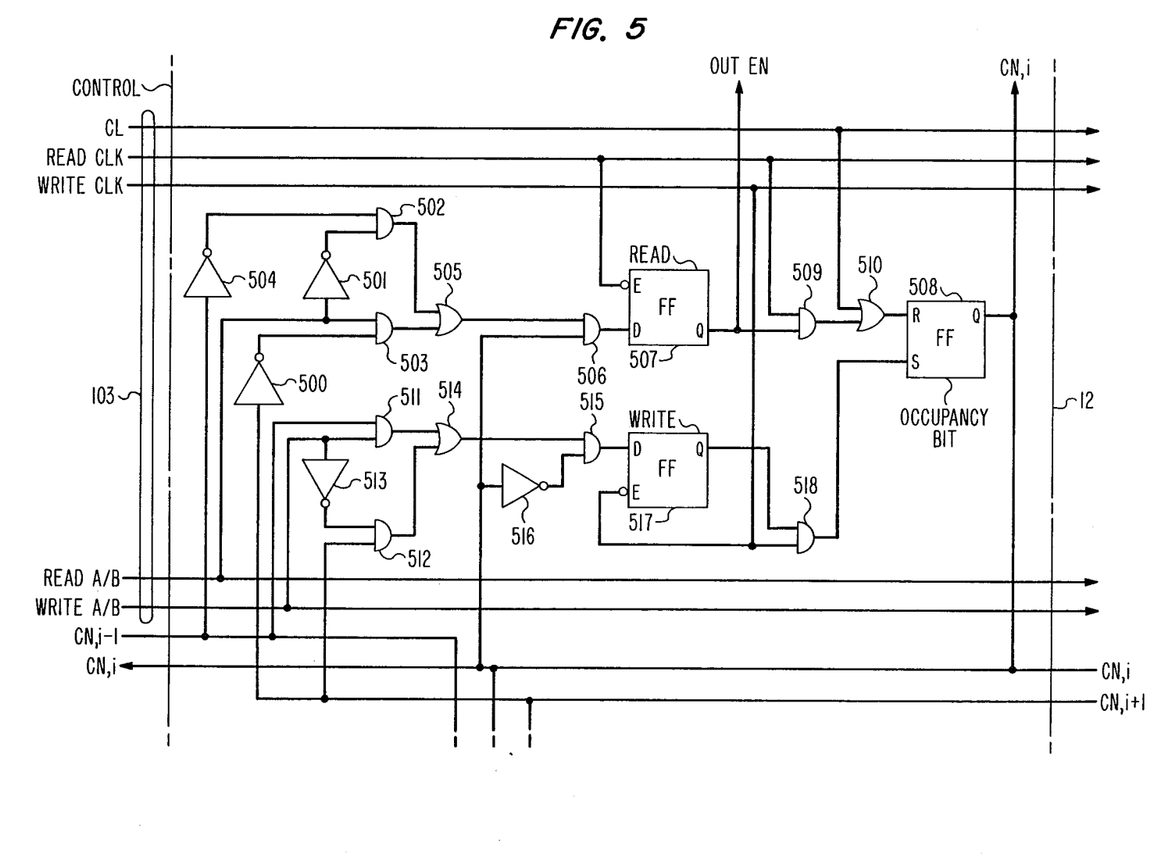
FIG. 5 shows the circuitry of the control section of one FIFO/LIFO cell.

The control section 12 of the FIFO/LIFO cell is shown in FIG. 5. Generally, control circuit 12 monitors the command bus 103 and the occupancy of itself (CN,i) and its two neighbors (CN,i−1; CN,i+1). From this information the control circuit determines the cell's relative position in the data queue; maintains the occupancy bit; and decides whether to store the data on the input bus, to place the stored data on the output bus, or neither.

Control section 12 consists of read control circuit (500-507), write control circuitry (511-517) and occupancy status circuits (508-510, 518). The control lines into the control section consists of a READ A/B signal which indicates whether to read from the A or B end of the data queue, a READ CLOCK signal which indicates when to read, a WRITE A/B signal which indicates whether to write to the vacant cell next to the A or B end of the queue, a WRITE CLOCK which indicates when to write, and a global CLEAR signal which resets the occupancy bit flip-flop 508.

Figure 10:
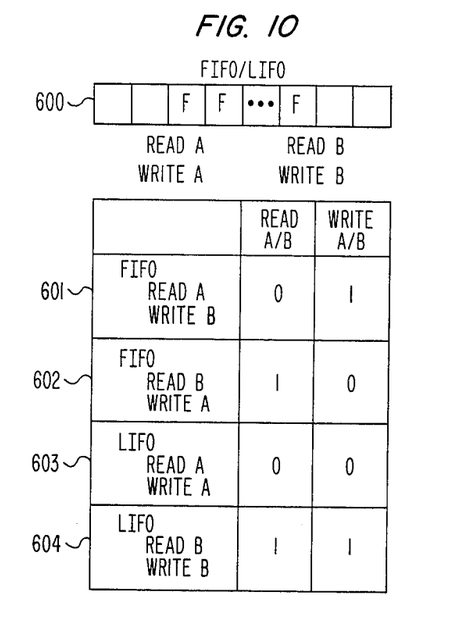
FIG. 10 shows a table illustrating the various operating modes of the present FIFO/LIFO memory design.

With reference to FIG. 10, the signals required on control leads READ A/B and WRITE A/B to implement a FIFO or LIFO are shown. To implement a FIFO which writes to end A (see FIG. 2) and reads from end B, the signals on leads are READ A/B=0 and WRITE A/B=1. Reversing the signals in leads READ A/B and WRITE A/B causes the FIFO to write to end B and read from end A. To implement a LIFO which reads and writes from end A, leads READ A/B and WRITE A/B must both be logic 0. To implement a LIFO which writes and reads from end B leads READ A/B and WRITE A/B must both be logic 1. Thus, the four combination of signals on leads READ A/B and WRITE A/B result in two different operating modes (A or B end) for two different types of memories (FIFO, LIFO). The circuitry which implements the operation of FIG. 10 is part of FIG. 5.

Figure 6:
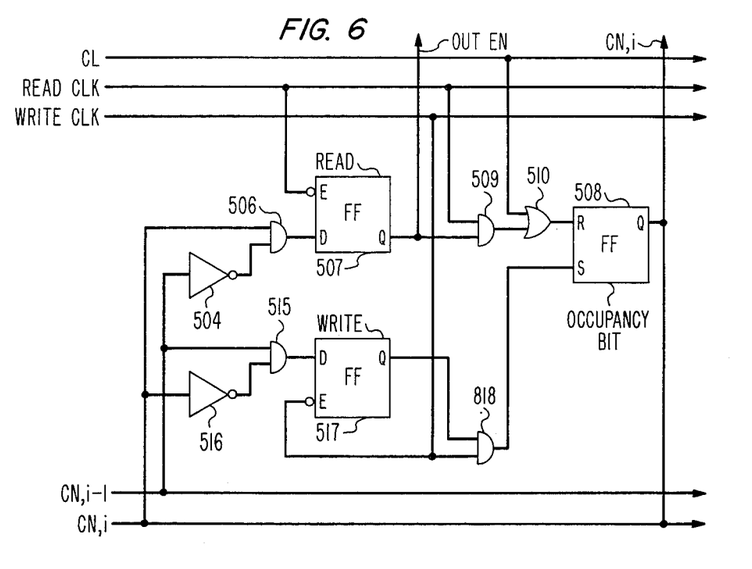
FIG. 6 shows the logical equivalence of the enabled circuitry of FIG. 5 which forms a FIFO which reads from end A and writes to end B.

With joint reference to FIGS. 2, 5 and 10, an illustrative operatin of a FIFO which reads from end A and writes to end B, 601, is described. The logic 0 on lead READ A/B enables AND gate 502 via inverter 501 but disables AND gate 503. Illustratively shown in FIG. 6 is the logical equivalence of the resulting enabled circuitry of FIG. 5 which form a FIFO which reads from end A and writes to end B. .

As shown in 209 of FIG. 2, positional addressing identifies the A end of the data queue by the logic 0 (empty) status in cell, C,i−1 and the logic 1 (full) condition in cell C,i. Note, the status of cell C,i+1 merely adds additional information about whether C,i is the first/last cell in data queue (208 of FIG. 2). Since this additional C,i+1 information is not important for the read or write operation, it is not utilized.

The logic 0 from cell CN,i−1 is inverted by inverter 504 and gated by AND gate 502 to OR gate 505. Since CN,i, occupancy bit 508, is logic 1 and the output of gate 505 is logic 1 the output of AND gate 506 and hence input D of read latch 507 is at logic 1.

Figure 11:
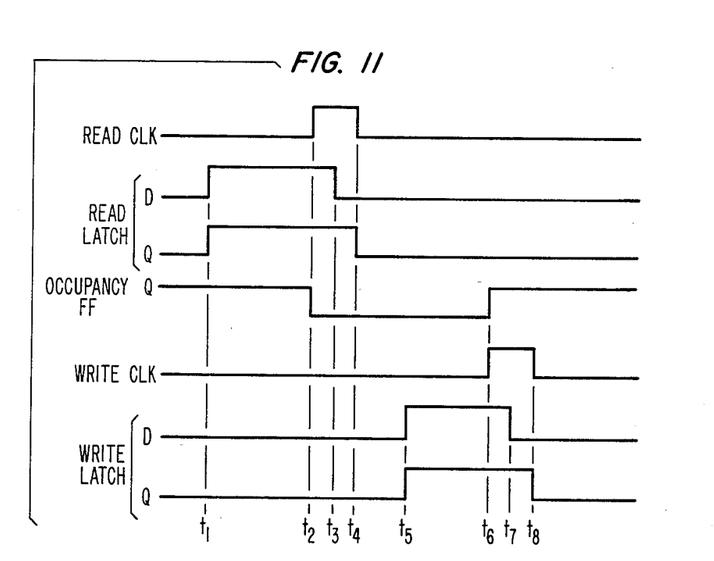
FIG. 11 shows the read and write timing of a FIFO/LIFO cell.

With joint reference to FIG. 5 and timing diagram FIG. 11, the relative timing of the read control signals will be described. The D input of READ latch 507 goes to logic 1 at time t1, as described above. Read latch 507 is a device where output Q follows input D while enable lead E is logic 0, when lead E becomes logic 1 (rising edge) output Q is latched at its current logic state. Thus, output Q of READ latch 507 follows input D from time t1 to t2. Since we assumed that a read from end A of a data queue was desired, the occupancy bit flip-flop 508, which indicates that there is data in the FIFO to be read, is set (full), thereby causing output Q and lead CN,i to be logic 1. On the rising edge of a READ CLK signal, at time t2, the output Q of READ latch 507 is fixed at logic 1, the current state of input D. The output Q of READ latch 507 is the OUTPUT ENABLE lead which, as will be discussed later, enables a read operation from the data storage section (13 of FIG. 1).

The READ CLK signal is also ANDed in gate 509 with the output Q of READ latch 507 to form a reset signal from OR gate 510 to reset R of the occupancy bit flip-flop 508 at time t2. Note, when occupancy flip flop 508 is reset its output Q became logic 0, which changes the data on lead C,i which alters the cell's relative position in the data queue. When lead CN,i becomes logic 1 gate 506 is disabled and the input D to READ latch 507 becomes logic 0 at time t3, after a nominal gate delay t2-t3. However, this change on lead D does not affect the contents of READ latch 507 since the latch is only sensitive during the rising edge of the READ CLK signal. This master-slave arrangement, between the READ latch 507 and the occupancy bit flip-flop 508 is necessary to prevent the domino-like effect previously mentioned. Obviously, other master-slave flip-flop arrangements can be utilized with the present invention. When READ CLK signal returns to logic 0 at time t4, the output Q of READ latch 507 again follows the D input and becomes logic 0.

To enable the writing to a FIFO from end B lead WRITE A/B is logic 1 as shown in 601 of FIG. 10. The logic 1 on lead WRITE A/B enables AND gate 511 and disables AND gate 512 via inverter 513. Thus, the occupancy status of cell CN,i−1 is considered and the status of cell CN,i+1 is not to be considered. As shown in 210 of FIG. 2, any write operation to the B end of a data queue requires a vacant cell next to B. This condition requires a full status of adjacent cell CN,i−1 and an empty, logic 0 status at cell CN,i. Again, whether or not it is the last vacant cell, 211, is not important for this write operation. Thus, a logic 1 output from AND gate 511 required a logic 1 signal on lead CN,i−1. The logic 1 output of AND gate 511 is gated through OR gate 514 to AND gate 515. The logic 0 on lead CN,i is inverted by inverter 516 and applied to another input of AND gate 515.

The output of AND gate 515 is logic 1 at time t5 and sets WRITE data latch 517 causing output Q to go to logic 1 at time t5. Note, since WRITE data latch 517 is identical to READ latch 507, it operates in the identical manner thereto and hence the output Q is latched at time t5 to the current state of input D during the leading edge of the WRITE CLK signal.

The output of Q of WRITE data latch 517 is also ANDed together with the WRITE CLK in AND gate 518 and used to set occupancy bit flip-flop 508 at time t6. Output CN,i becomes logic 1 at t1 causing lead D of WRITE latch 517 to become logic 0 at time t7. Again, the master-slave operation between WRITE data latch 517 and occupancy bit flip-flop 508 prevents any erroneous domino-like operation. At time t8 when the WRITE CLK becomes logic 0, the output Q of write latch 517 follows its input D and becomes logic 0.

Figure 7:
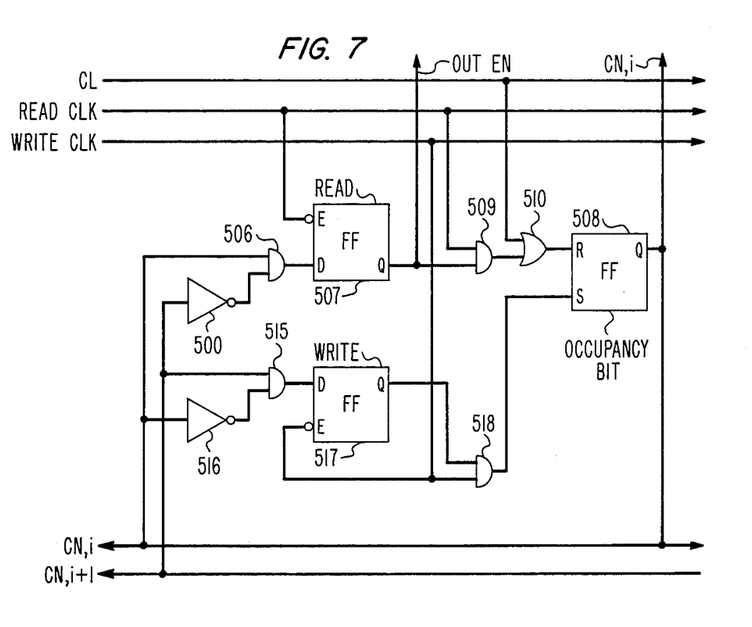
FIG. 7 shows the logical equivalence of the enabled circuitry of FIG. 5 which forms a FIFO which reads from end B and writes to end A.

With joint reference to FIGS. 5 and 10, to implement a FIFO with a write to end A and read from end B, 1002, then READ A/B=1 and WRITE A/B=0. With reference to FIG. 5, with READ A/B=1, AND gate 503 is enabled and AND gate 502 disabled. Illustratively shown in FIG. 7 is the logical equivalence of the resulting enabled circuitry of FIG. 5 which form a FIFO which reads from end B and writes to end A.

Thus, as shown in 210 of FIG. 2, a signal C,i+1=empty and C,i=full is required to read the B end of the data queue. Again, in a manner identical to that previously described above for the read operation to end A, the READ data latch 507 and occupancy flip-flop 508 of FIG. 5 are set. To perform a write operation to end A the signal WRITE A/B=0 enabled AND gate 512 and disables AND gate 511. Thus, as shown in 207 of FIG. 2, a signal C,i+1=full and C,i=empty is required to write to the A end of the data queue. Again in a manner identical to that previously described above the WRITE data latch 517 and the occupancy bit flip-flop 508 of FIG. 5 are cleared and set respectively.

Figure 8:
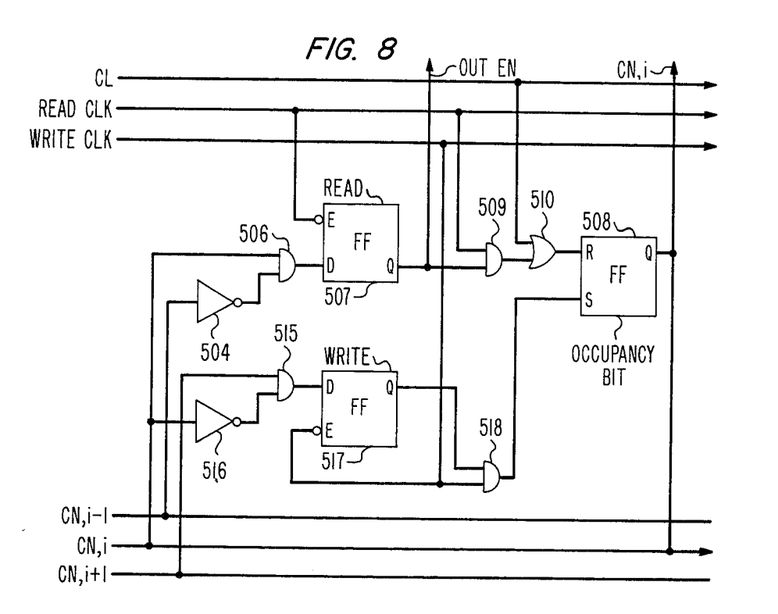
FIG. 8 shows the logical equivalence of the enabled circuitry of FIG. 5 which forms a LIFO which reads from end A and writes to end A.

With reference to FIGS. 5 and 10 again, to implement a LIFO with a write to and read from end A, 603, requires a logic 0 on both leads READ A/B and WRITE A/B. With reference to FIG. 5, with READ A/B=0, AND gate 502 is enabled and AND gate 503 is disabled. Illustratively shown in FIG. 8 is the logical equivalence of the resulting enabled circuitry of FIG. 5 which form a LIFO which reads from end A and writes to end A.

The operation proceeds as previously described for the read A operation to a FIFO to write to end A, WRITE A/B is logic 0 which enables AND gate 512 and disables AND gate 511. The operation is identical to that described previously for a FIFO write to end A.

Figure 9:
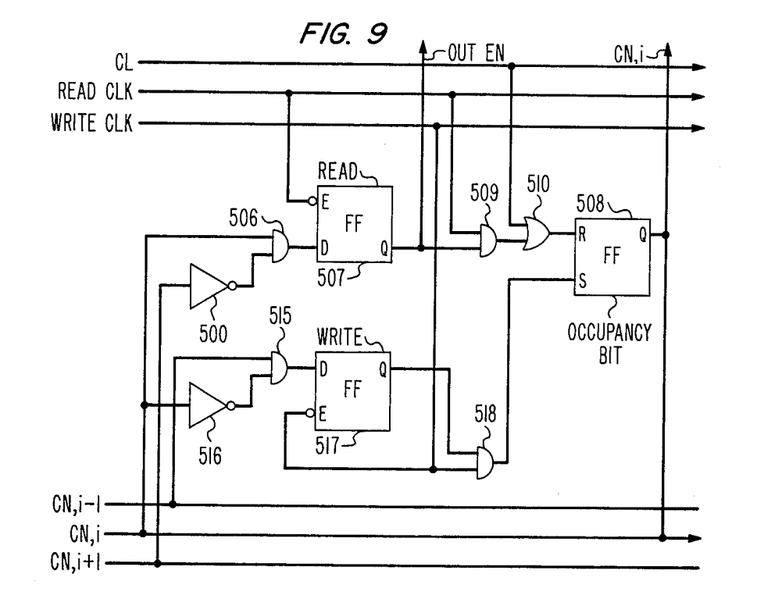
FIG. 9 shows the logical equivalence of the enabled circuitry of FIG. 5 which forms a LIFO which reads from end B and write to end B.

Finally, to implement a LIFO with a write to and read from end B, 604, requires a logic 1 on both leads READ A/B and WRITE A/B. With reference to FIG. 5, with READ A/B=1, AND gate 503 is enabled and AND gate 502 disabled. Illustratively shown in FIG. 9 is the logical equivalence of the resulting enabled circuitry of FIG. 5 which form a LIFO which reads and writes from end B.

The operation proceeds as previously described for a read B operation to a FIFO. To write to end B, WRITE A/B is logic 1 which enables AND gate 511 and disables AND gate 512. This operation is identical to the previously described write B operation for a FIFO.

It should be noted that a simultaneous set and reset of the occupancy bit is not possible during operation as a FIFO, since the same cell is never read and written at the same time. A simultaneous set and reset of the occupancy bit of a cell is possible during normal operation as a LIFO, however, such a simultaneous read and write is not part of normal LIFO discipline.

When a global clear signal (CL) is applied to control section 12, the occupancy bit flip-flop 508 is reset. The global clear signal is used during the initialization step, to empty all the cells.

The storage section 13 of a FIFO/LIFO cell is shown in FIG. 12. As previously noted, the storage section can be made with an arbitrary number of latches J to input and output data items of any size and, correspondingly, the input bus IN and output bus OUT are also J bits wide. Consequently, D-type flip-flops 1201-1 through 1201-J and tri-state buffers 1202-1 through 1202-J are provided for in FIG. 12. Each input D of a flip-flop connects to an associated input lead while each output Q connects through an associated buffer to an output lead of output bus OUT. The occupancy status signal CN,i interconnects to the clock lead C on the latches. Information is written into data latches 1201-1 through 1201-J on the positive going edge of signal CN,i, the output Q of occupancy flip-flop 508 of FIG. 5. Thus, the occupancy flip-flop 508, CN,i, is used both as a latch enable signal as well as an occupancy status indicator. Information is read from data latches 1201-1 through 1201-J when output enable signal OUT EN is logic 1. Tri-state buffers 1201-1 through 1202-J have an open collector output when the common enable signal OUT EN is at logic 0. When output enable signal OUT EN is logic 1, the output of each data latch 1201-1 through 1201-J is gated to the respective output lead OUT,1 through OUT,J by an associated one of tri-state buffers 1202-1 through 1202-J.

It is anticipated that many other well known circuits can be utilized to implement some or all of the circuitry and functions of the present invention. While the present memory circuit invention is implemented using complementary metal oxide semiconductor (CMOS) technology it is anticipated that other embodiments using any of the well known discrete, hybrid or integrated circuit techniques. Thus, what has been disclosed is merely illustrative of the present invention and other arrangements or methods can be implemented by those skilled in the art without departing from the spirit and scope of the present invention.

What is claimed is:

1. A memory circuit including a plurality of memory cells all connected to a common input bus and a common output bus and each memory cell including data storage means and a control circuit, said control circuit comprising
    means for generating a data occupancy status signal,
    write control means responsive to data occupancy status signals from said memory cell and a selectable adjacent memory cell for controlling the writing of data from said input bus into said data storage means, and
    read control means responsive to data occupancy status signals from said memory cell and a selectable adjacent memory cell for controlling the reading of data from said data storage means to said output bus.

2. The control circuit of claim 1 wherein said write control means and said read control means are responsive to an occupancy status signal from the same adjacent memory cell.

3. The control circuit of claim 1 wherein said write control means and said read control means are responsive to an occupancy status of signal from different adjacent memory cells.

4. The control circuit of claim 1 wherein said write control means writes data into said data storage means in response to a group of signals selectable from a set comprising
    a first group including a first control signal and the occupancy status signals from said memory cell and a first adjacent memory cell and
    a second group including a second control signal and the occupancy status signals from said memory cell and a second adjacent memory cell.

5. The control circuit of claim 1 wherein said read control means reads data from said data storage means in response to a group of signals selectable from a set comprising
    a first group including a first control signal and the occupancy status signals from said memory cell and a first adjacent memory cell and
    a second group including a second control signal and the occupancy status signals from said memory cell and a second adjacent memory cell.

6. The control circuit of claim 1 wherein
    said write control means sets said data occupancy status signal generating means to an occupied status before the writing of data into said data storage means, and
    said read control means clears said data occupancy status signal generating means after the reading of data from said data storage means.

7. The control circuit of claim 1 further including
    means responsive to a first state of a binary control signal for gating the same adjacent occupancy status signal to said read control means and said write control means and responsive to a second state of said binary control signal for gating different adjacent cell occupancy status signals to said read control means and said write control means.

8. The control circuit of claim 7 wherein said gating means includes
    means responsive to a second control signal for changing the adjacent occupancy status signal gated to both said read control means and said write control means.

9. A memory circuit comprising an initialization circuit and a first, a last, and at least one intermediate memory cell all connected to a common input bus and a common output bus, each memory cell including
- a data storage means for storing from said input bus and outputting data to said output bus and
- a control circuit including a data occupancy status signal means and a write control means wherein
- said write control means of said first memory cell is responsive to a data occupancy status signal from said first memory cell and a signal selected from a group of signals including a first output signal from said initialization circuit and a data occupancy signal from a subsequent adjacent memory cell for controlling the writing of data into the associated data storage means,
- said write control means of said at least one intermediate memory cell is responsive to a data occupancy status signal from said at least one intermediate memory cell and a data occupancy status signal from a selected adjacent memory cell for controlling the writing of data into the associated data storage means,
- said write control means of said last memory cell is responsive to said data occupancy signal from said last memory cell and a signal selected from a group of signals including a data occupancy status signal from a preceding adjacent memory cell and a second output signal from said initialization circuit for controlling the writing of data into the associated data storage means, and
- said initialization circuit generating said first output signal to said first memory cell in response to said data occupancy status signal from said last memory cell and an all memory cells empty signal and generating said second output signal to said last memory cell in response to said data occupancy status signal from said first memory cell and said all memory cells empty signal.

10. The memory circuit of claim 9 wherein each control circuit includes a read control means wherein
- said read control means of said first memory cell is responsive to said data occupancy status signal from said first memory cell and the signal selected from a group of signals including said first output signal from said initialization circuit and said data occupancy from said subsequent adjacent memory cell for controlling the reading of data into the associated data storage means,
- said read control means of said at least one intermediate memory cell is responsive to said data occupancy status signal from said at least one intermediate memory cell and said data occupancy status signal of said selected adjacent memory cell for controlling the reading of data into the associated data storage means, and
- said read control means of said last memory cell is responsive to said data occupancy signal from said last memory cell and the signal selected from a group of signals including said data occupancy status signal from said preceding adjacent intermediate memory cell and said second output signal from said initialization circuit for controlling the reading of data with the associated data storage means.

* * * * *